(12) United States Patent
Ohara et al.

(10) Patent No.: US 7,050,060 B1
(45) Date of Patent: May 23, 2006

(54) DATA TRANSFERRING APPARATUS AND ITS METHOD

(75) Inventors: Moriyoshi Ohara, Yokohama (JP); Sanehiro Furuichi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 956 days.

(21) Appl. No.: 09/684,328

(22) Filed: Oct. 10, 2000

(30) Foreign Application Priority Data

Oct. 7, 1999 (JP) .................................. 11-287268

(51) Int. Cl.
  *G06F 13/00* (2006.01)
  *G06T 1/00* (2006.01)
(52) U.S. Cl. ..................... 345/537; 345/536; 345/522
(58) Field of Classification Search ................ 345/522, 345/537, 538, 562, 545, 530, 501; 710/6, 710/21; 712/206, 205, 215, 214, 216
See application file for complete search history.

(56) References Cited

U.S. PATENT DOCUMENTS

| | | | | |
|---|---|---|---|---|
| 4,555,775 A | * | 11/1985 | Pike ........................... 715/790 |
| 5,241,625 A | * | 8/1993 | Epard et al. ................. 345/502 |
| 5,265,203 A | * | 11/1993 | Peaslee et al. .............. 345/502 |
| 5,544,306 A | * | 8/1996 | Deering et al. ............. 345/545 |
| 5,640,588 A | * | 6/1997 | Vegesna et al. .............. 712/23 |
| 5,664,163 A | * | 9/1997 | Yutaka et al. ............... 345/522 |
| 6,279,041 B1 | * | 8/2001 | Baber et al. ................. 709/232 |
| 6,392,619 B1 | * | 5/2002 | Nitta et al. .................. 345/87 |
| 6,405,267 B1 | * | 6/2002 | Zhao et al. .................. 710/35 |
| 6,437,789 B1 | * | 8/2002 | Tidwell et al. .............. 345/557 |
| 6,563,505 B1 | * | 5/2003 | Mills et al. ................. 345/522 |

* cited by examiner

*Primary Examiner*—Kee M. Tung
*Assistant Examiner*—Joni Hsu
(74) *Attorney, Agent, or Firm*—Satheesh Karra, Esq.; McGinn IP Law Group, PLLC

(57) ABSTRACT

A data transferring apparatus for transferring transfer packets each including one or more transfer data as objectives of transfer from a first apparatus to a second apparatus, each transfer data including commands indicating processes against a preliminarily assigned area, the first apparatus comprises a unit for merging a plurality of the transfer data meeting a certain requirement, a unit for generating transfer packets each including at least one of one or more the transfer data whose amount is within a certain predetermined range and one or more the merged transfer data, and a unit for transferring the generated transfer packets to the second apparatus.

25 Claims, 15 Drawing Sheets

| Attributes of drawing area | Coordinates of drawing location | Size of drawing areas | Attributes of source areas | Coordinates of source areas | ROP |

| Attributes of drawing areas | Attributes of source areas | Attributes of mask pattern | Clipping information | Color information | Coordinates and size of drawing location | Coordinates of mask pattern | Attributes of pattern | Coordinates of pattern |

| Kind of command | Length of data | Data proper to command |

DATA TRANSFERRING APPARATUS AND ITS METHOD

BACKGROUND OF THE INVENTION

1. Field of the Invention

This invention relates to a data transferring apparatus and its method for efficiently transferring an image and other data.

2. Description of the Related Art

Presently, a raster interface is used to transfer image data from a computer to a display apparatus. However, using a raster interface requires transferring a large amount of data because all the pixel data is transferred from the computer to the display apparatus. Therefore, in cases such as connecting an ultra-high resolution display apparatus to a computer, if a raster interface is used to transfer image data, there is a possibility that the data transferring capacity of the communication channel between the computer and the display apparatus may not be sufficient.

SUMMARY OF THE INVENTION

In view of the foregoing and other problems, disadvantages, and drawbacks of the conventional methods and structures, an object of the present invention is to provide a data transferring apparatus and its method to allow more efficient transfer of image data in cases such as connecting an ultra high resolution display apparatus to a computer.

In a first aspect, a data transferring apparatus according to the present invention, is an apparatus to transfer from a first apparatus to a second apparatus one or more transfer packets as objectives of transfer, the each transfer data including commands indicating processes against a preliminarily assigned area, the first apparatus including means for merging a plurality of the transfer data meeting a certain requirement, means for generating transfer packets each including one or more of the transfer data of which the amount is within a certain range and/or one or more of the merged transfer data, and means for transferring the generated transfer packets to the second apparatus.

In a second aspect, a data transferring method according to the present invention is a method of transferring from a first apparatus to a second apparatus transfer packets each including one or more of transfer data as objectives of transfer, the each transfer data including commands indicating processes against a preliminarily assigned area, and the first apparatus being capable of: merging a plurality of the transfer data meeting a certain requirement, generating transfer packets each including one or more of transfer data of which the amount is within a certain predetermined range and/or one or more of the merged transfer data; and transferring the generated transfer packets to the second apparatus.

In yet another aspect, a programmable storage medium involved in the invention is a program for transferring transfer packets each including one or more of transfer data as objectives of transfer from a first apparatus to a second apparatus, the each transfer data including commands indicating processes against a preliminarily assigned area, and the first apparatus capable of making a computer execute the steps of merging the transfer data meeting a certain requirement, generating transfer packets each including one or more the transfer data of which the amount is within a certain predetermined range and/or one or more the merged transfer data, and transferring the generated transfer packets to the second apparatus.

The present disclosure relates to subject matter contained in Japanese Patent Application No. 11-287268, filed Oct. 7, 1999, which is expressly incorporated herein by reference in its entirety.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
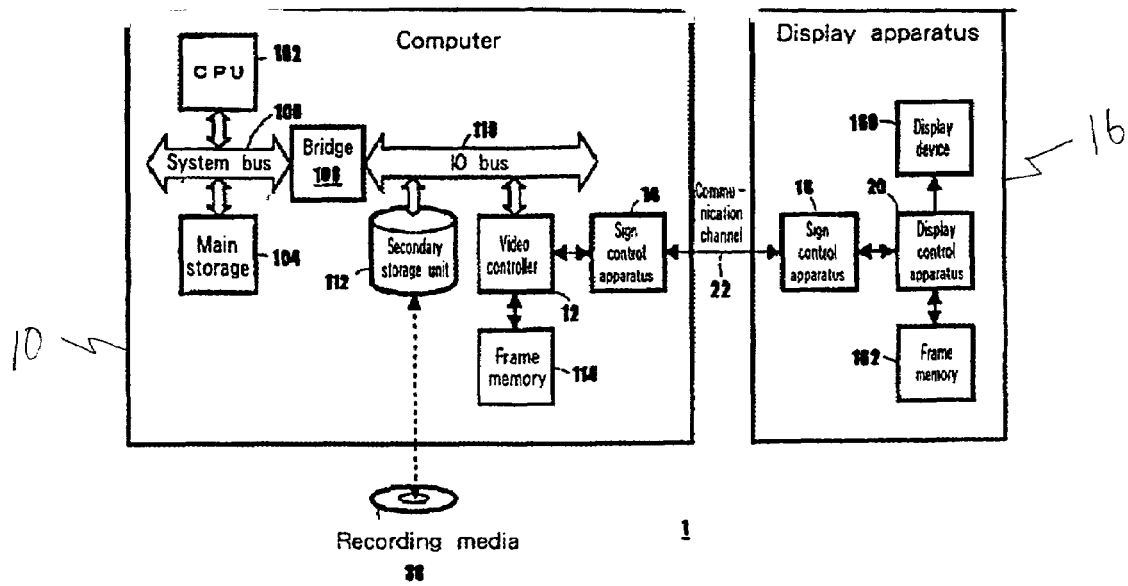
FIG. 1 is a diagram showing the configuration of an image processing apparatus 1 to practice an image processing method of the present invention.

Referring now to the drawings, and more particularly to FIGS. 1–19, there are shown preferred embodiments of the method and structures according to the present invention.

FIRST EMBODIMENT

FIG. 1 shows a configuration of an image processing apparatus for performing an image processing method of the invention.

As shown in FIG. 1, the image processing apparatus 1 includes computer 10 and display apparatus 16 which are connected via communication channel 22.

Computer 10 includes CPU 102 including a general-purpose CPU and its peripheral circuits, etc., main storage unit 104 including RAM and its peripheral circuits, etc., secondary storage unit 112 such as a hard disc apparatus or a CD-ROM apparatus, video controller 12, frame memory 114, and sign control apparatus 14, all of these being connected via system bus 100, bridge 106, and input/output (IO) bus 110.

In other words, computer 10 is configured as a general-purpose computer with necessary image processing functions.

Display apparatus 16 includes sign control apparatus 18, display control apparatus 20, frame memory 162, and display device 160.

Figure 2:
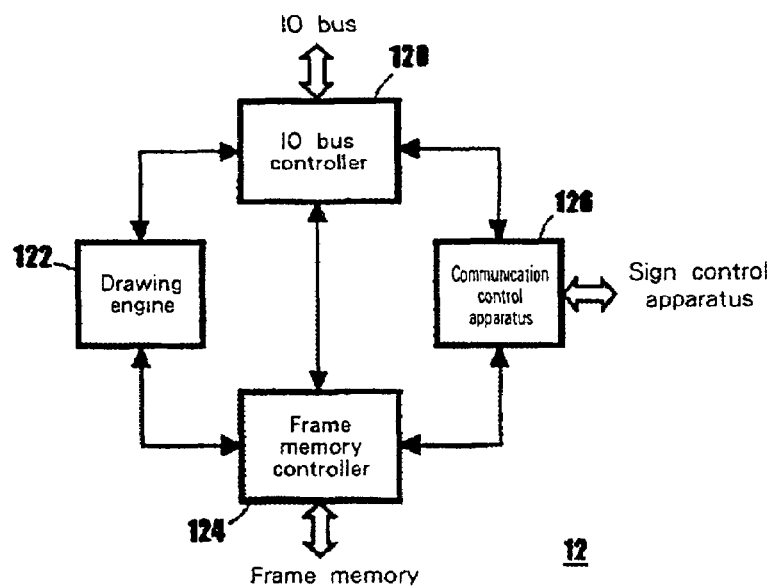
FIG. 2 is a diagram showing a sample configuration of a video controller shown in FIG. 1.

FIG. 2 illustrates a sample configuration of video controller 12 shown in FIG. 1. Video controller 12 includes, as shown in FIG. 2 for example, 10 bus controller 120, drawing engine 122, frame memory controller 124, and communication control apparatus 126.

Based on these configuration elements, video controller 12 carries out a drawing processing in accordance with the drawing command from CPU 102 and stores the image data obtained as the result thereof in frame memory 114.

Video controller 12 also transfers drawing commands, etc. between itself and sign control apparatus 14 or display apparatus 16.

Frame memory controller 124 (FIG. 2) serves to mediate the memory access demands among IO bus controller 120, drawing engine 122, and communication control apparatus 126, and to control refreshing of frame memory 114.

IO bus controller 120 interfaces 10 bus 110 with corresponding components of video controller 12.

Drawing engine 122 generates image data in accordance with drawing command from CPU 102 and stores the data in frame memory 114. The drawing commands include such items as Bit Block Transfer (BitBlt), linear/curve drawing, and font realization. Communication control apparatus 126 receives drawing commands from CPU 102 and transfers them to display apparatus 16 via sign control apparatus 14. When such drawing commands include pixel information in the frame memory, then communication control apparatus 126 reads out pixel data from frame memory 114 and transfers them to sign control apparatus 14. Communication control apparatus 126 also receives ACK signals which are sent from display apparatus 16 in order to notify the completion of drawing commands.

Frame memory 114 (FIG. 1) stores temporary image data such as pattern data and font data as well as pixel data displayed by display apparatus 16. The area in frame memory 114 storing image data such as pattern data and font data is also called an "off-screen memory area".

Figure 3:
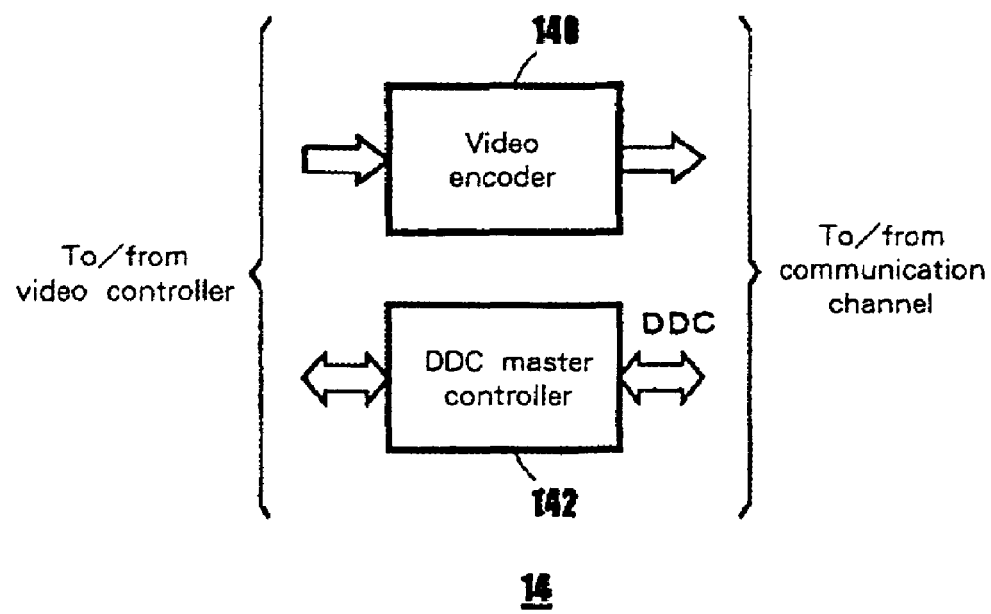
FIG. 3 is a diagram showing a sample configuration of a sign control apparatus 14 on the side of computer 10 as shown in FIG. 1.

FIG. 3 shows a sample configuration of sign control apparatus 14 on the side of computer 10 shown in FIG. 1.

As illustrated in FIG. 3, sign control apparatus 14 includes video encoder 140 and DDC master controller 142. Based on these components, sign control apparatus 14 encodes the drawing commands received from video controller 12 and transfers them to display apparatus 16. Sign control apparatus 14 also receives ACK signals indicating the completion of drawing commands from display apparatus 16 and outputs them to video controller 12.

Video encoder 140 transfers the drawing command received from communication control apparatus 126 (FIG. 2) of video controller 12 to display apparatus 16 via communication channel 22. DDC master controller 142 transfers the ACK signal from display apparatus 16 to communication control apparatus 126.

Figure 4:
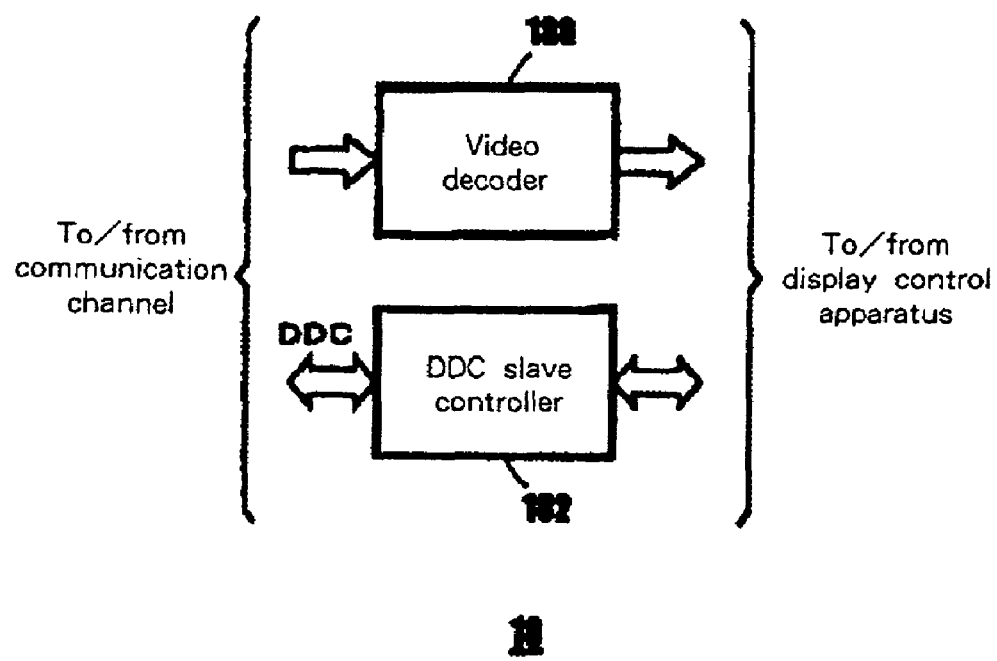
FIG. 4 is a diagram showing a sample configuration of a sign control apparatus 18 on the side of a display apparatus 16 shown in FIG. 1.

FIG. 4 shows a sample configuration of sign control apparatus 18 on the side of display apparatus 16 shown in FIG. 1. As illustrated in FIG. 4, sign control apparatus 18 of display apparatus 16 includes video decoder 180 and DDC slave controller 182. Sign control apparatus 18 corresponds to sign control apparatus 14 of computer 10 and outputs the data received from computer 10 to display control apparatus 20.

Video decoder 180 corresponds to video encoder 140 (FIG. 3) of computer 10 and receives image data etc. from computer 10 and outputs them to display control apparatus 20.

DDC slave controller 182 corresponds to DDC master controller 142 (FIG. 3) of computer 10 and transfers ACK signals to computer 10.

Display apparatus 160 preferably is a cathode ray tube (CRT) display, a liquid crystal display, or a plasma display, and displays visually the image data input from display control apparatus 20 to the user of image processing apparatus 1.

Figure 5:
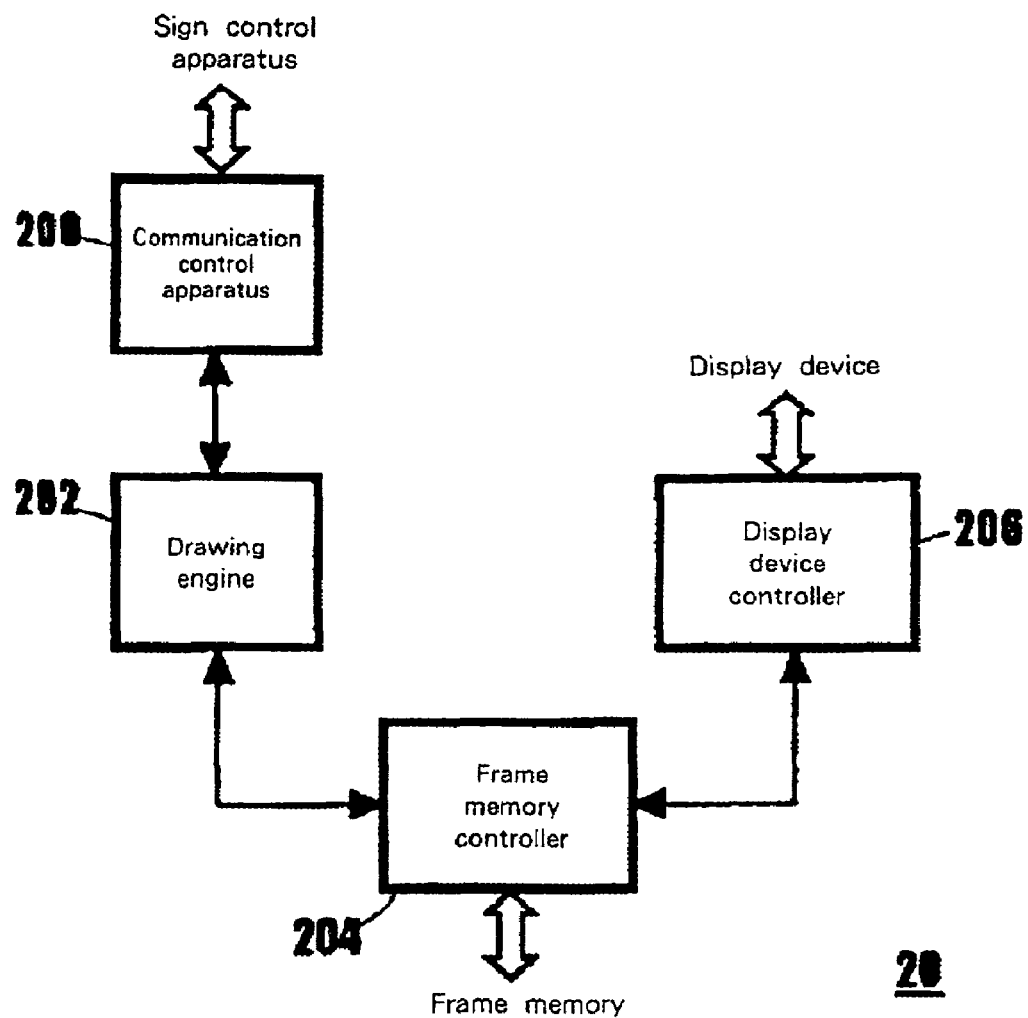
FIG. 5 is a diagram showing the configuration of the display control apparatus shown in FIG. 1.

FIG. 5 illustrates a configuration of display control apparatus 20 shown in FIG. 1. As shown in FIG. 5, display control apparatus 20 of display apparatus 16 includes communication control apparatus 200, drawing engine 202, frame memory controller 204, and display device controller 206. Based on these components, display control apparatus 20 executes drawing processes in accordance with drawing commands from computer 10, and stores the generated image data in frame memory 162 of display apparatus 16.

Display control apparatus 20 refreshes the image on the display device 160 at a designated cycle in accordance with the model of display device 160 (i.e. approximately between 60 Hz and 85 Hz).

In the same manner as frame memory controller 124 (FIG. 2) of computer 10, frame memory controller 204 serves to mediate the memory access demands between drawing engine 202 and display device controller 206 and to control refreshing of frame memory 162.

Display device controller 206 reads out pixel data of all the displayed pixels at a certain cycle from frame memory 162, transfers them to display device 160, and refreshes the images displayed on the display device 160.

Drawing engine 202 carries out image processing in accordance with the drawing commands from sign control apparatus 18, and stores the generated image data in frame memory 162.

Communication control apparatus 200 receives and transfers drawing commands and ACK signals between itself and computer 10. Frame memory 162 stores the copy of image data stored in frame memory 114 of computer 10. In other words, frame memory 162 stores the image data (e.g., pattern data and font data, etc.) temporarily stored in off-screen memory as well as pixel data displayed on display apparatus 16.

Among the components having important functions of the present invention are the video controller (hardware), the display control apparatus (hardware), and the graphic driver (software). In the configuration shown in FIG. 1, it is assumed that the video controller and the display control apparatus provide drawing functions as hardware, while the graphic driver controls each drawing command. The present invention is not dependent on whether it is hardware or software that materializes these three components. For instance, it is possible for the video controller to control, by hardware, drawing commands, just the same as the device driver does. Conversely it is also possible to attain video controller functions by software. In the latter case, frame memory is assigned in the main storage and the CPU makes a drawing on the main storage. In this case, the sign control apparatus in the computer transfers the image information, as well as a drawing command stored in the main storage, to the display apparatus.

Figures 6, 7:
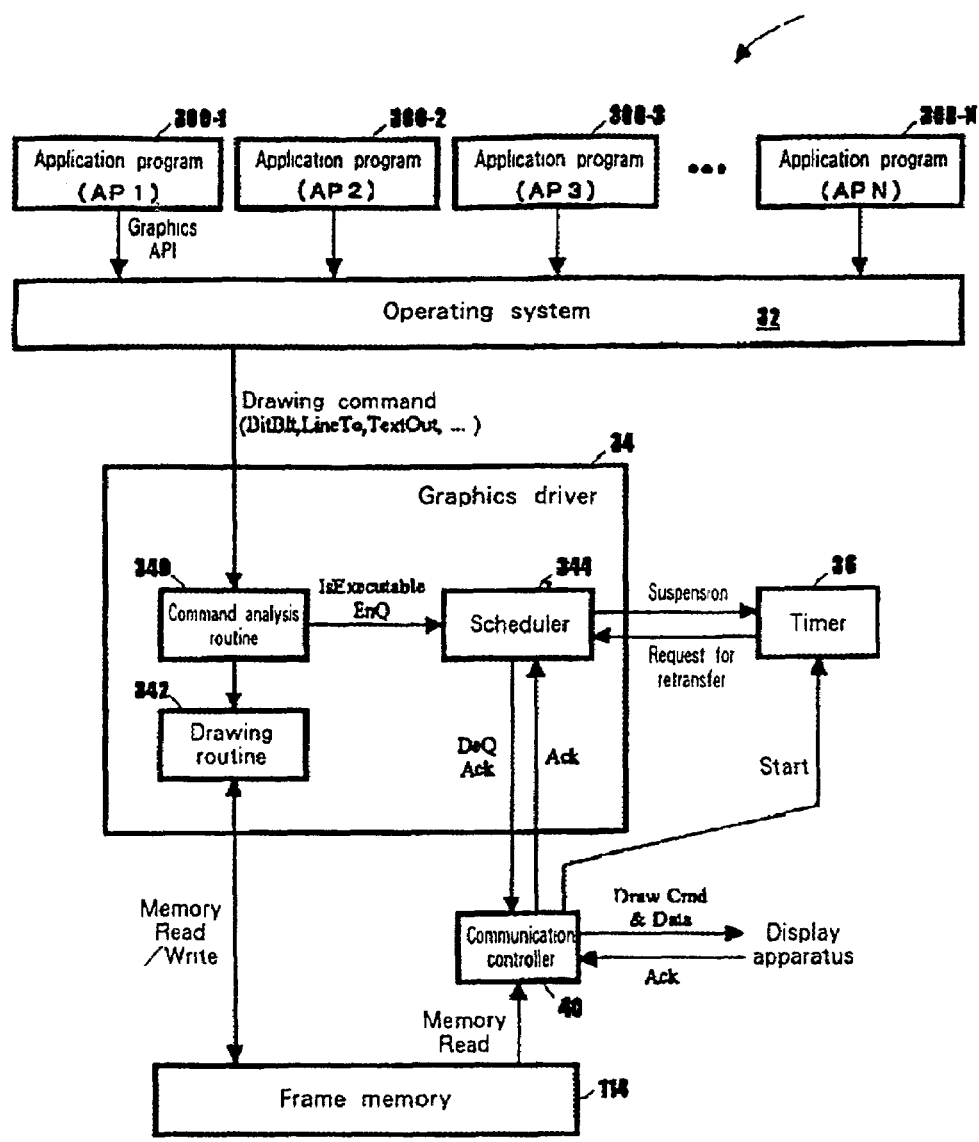
FIG. 6 is a diagram showing the configuration of an image processing program of the present invention.
FIG. 7 is a diagram showing a sample of data auto format of a graphics Application Program Interface (API) issued to an operating system (OS) by an application program shown in FIG. 6.

FIG. 6 illustrates a configuration of the image processing program 3 of the present invention. As shown in FIG. 6, the image processing program 3 includes application program 30 (300-1 to 300-N), operating system (OS) 32, graphics driver 34, timer 36, and communication controller 40.

Image processing program 3 is, for example, recorded in recording media 38 (FIG. 1) or is provided to the secondary storage unit 112 of computer 10 via network (not illustrated), and then is loaded on main storage 104 from secondary storage unit 112 to materialize the image processing method of this invention.

Application program 300-1 to 300-N (simply written as "application program 30" collectively when it is not necessary to specify any particular program) is, for example, an image processing program respectively to generate image data and requests OS 32 for image processing by graphics API (Application Program Interface) which displays generated image data on display apparatus 16 (FIG. 1), and have frame memory 114 store the image data. Application program 30 also requests OS 32 to read out the image data by graphics API in the same manner, so that the image data is read out from frame memory 114.

The data to be processed by application program 30 varies depending on the contents of processing and cannot be decided uniquely. For instance, the data as the object of application program 30 is static image data when application program 30 displays static images, but it is MPEG data when application program 30 displays animated images, and is text data when application program 30 displays characters.

FIG. 7 illustrates a sample data format which is transferred to OS 32 from application program 30 when application program 30 calls graphics API, as shown in FIG. 6. The processing result of application program 30 is a couple of parameters attached to a call for graphics API provided by OS 32, and the kinds of the graphics API are dependent on the specifications of OS 32. For instance, when application program 30 requires BitBlt of Win32 system as graphics API, as shown in FIG. 7, a graphics API is called with each data such as attributes of drawing areas (to specify drawing location, e.g. whether it is screen or buffer in the main storage), the coordinates of a drawing location (to show, for instance, the coordinates of the upper left corner of the rectangular drawing area), a size of the drawing area (width and height of the rectangular drawing area), attributes of the source area, the coordinates of the source area (the coordinates of the upper left corner of the rectangular source area; however, it is unnecessary to specify the area size since it is the same as the size of the drawing area), and ROP (which designates the arithmetic method of bit operation).

OS 32 may be an operating system such as OS2 (IBM) or Windows (Microsoft). OS 32 receives graphics requirement (drawing command) from application program 30 with graphics API and outputs it to graphics driver 34. Furthermore, as the need arises, OS 32 converts drawing command received from application program 30 into another type of drawing command that can be processed by graphics driver 34 and outputs it to graphics driver 34. For instance, assuming that OS 32 is Microsoft's Windows NT®, and although it receives BitBlt (Bit Block Transfer) command with API from application program 30, graphics driver 34 does not support BitBlt command, OS 32 converts the BitBlt command into a different command that can be executed by graphics driver 34 (e.g. CopyBits command) and outputs it to graphics driver 34.

OS 32, as the occasion demands, converts the parameters of the drawing command into a format that can be processed by graphics driver 34, and outputs it to graphics driver 34. For instance, in the event that a part of the area that is the object of the image processing extends out of the screen or is hidden behind the window of another application program 30, the operating system 32 applies a clipping process to the processing area and rectifies the coordinates of the drawing area (FIG. 7).

Figures 8, 9, 10:
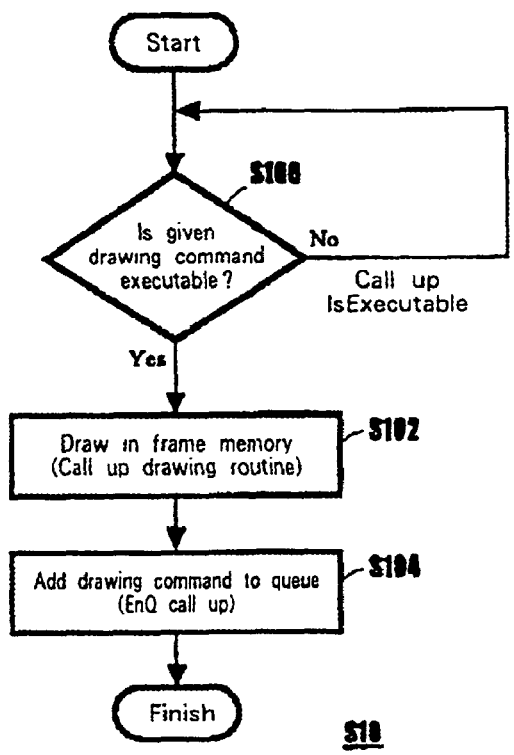
FIG. 8 is a diagram showing a sample of drawing command issued the by OS (FIG. 6) to a graphics driver.
FIG. 9 is a flowchart that shows the processing of command analysis routine (S10) conducted by the graphics driver (FIG. 6)
FIG. 10 is a diagram showing a sample of data output from command analysis routine as the result of processing.

FIG. 8 illustrates a sample data attached to drawing command that OS 32 (FIG. 6) requires to graphics driver 34. As shown in FIG. 8, when OS 32 requires a BitBlt as a drawing command to graphics driver 34, in this BitBlt command are attached the data received from application program 30 via graphics API (e.g., such as attributes of drawing areas) and data converted from and/or added to the data from application program 30 by OS 32 (e.g., coordinates of a mask pattern etc.).

According to the operations of scheduler 344 and communication controller 40, timer 36 carries out timer functions to monitor a timeout of waiting for the receipt of ACK signal that indicates the completion of processing at display apparatus 16, responding to each drawing command transferred from computer 10 to display apparatus 16 or responding to respective command group that contains a plurality of drawing commands.

FIG. 9 is a flowchart showing the processing of command analysis routine 340 (S10) of graphics driver 34 (FIG. 6). Command analysis routine 340 of graphics driver 34 analyzes the drawing commands input from OS 32, and in accordance with the result of analyses controls the operation of other components of graphics driver 34.

As shown in FIG. 9, at step 100 (S100), command analysis routine 340 calls a function provided by scheduler 344 (e.g., IsExecutable function) with drawing command received from OS 32 and inquires scheduler 344 as to whether the drawing command is immediately executable. Scheduler 344 notifies command analysis routine 340 whether the drawing command in question is executable or not by checking the dependency with other drawing commands. When a drawing command is executable, it proceeds to process S102. Otherwise, it stays at process S100 until such command becomes executable.

At step 102 (S102), command analysis routine 340 issues to drawing routine 342 a drawing command to activate drawing routine 342. The drawing routine 342 carries out drawing operation in accordance with the drawing command input from command analysis routine 340, and writes in frame memory 114 the image data obtained as the result of the drawing operation.

At step 104 (S104), command analysis routine 340 passes scheduler 344 a drawing command by calling a function (EnQ function). Upon receipt of this function call, scheduler 344 carries out processes such as transferring the drawing command to display apparatus 16.

FIG. 10 illustrates a sample data to be output as a result of the processing conducted by command analysis routine 340. As shown in FIG. 10, command analysis routine 340 issues to drawing routine 342 as well as scheduler 344 the drawing commands which contain the data peculiar to the command such as parameters of drawing commands received from OS 32 (FIG. 8) attaching each command with a header indicating the kind and length of command. In the result of processing as shown in FIG. 10, the kind of commands shows the kind of drawing commands to be processed by scheduler 344 and display apparatus 16 (FIG. 1), which is different from the kind of drawing commands provided by operating system 32.

Command analysis routine 340 converts the drawing command given from operating system 32 into a format that is processible for scheduler 344 and display apparatus 16, and issues them to the corresponding components of these apparatus. For instance, when command analysis routine 340 receives BitBlt from operating system 32, command analysis routine 340 converts it into drawing command supported by display apparatus 16 such as BitBltSourceCopy, BitBltPatternCopy, and BitBltDestinationInvert, etc. In the event that command analysis routine 340 received a drawing command not supported by display apparatus 16, command analysis routine 340 may in some cases convert a drawing command into a command of pixel transfer mode (X←IMAGE).

The length of data (FIG. 10) designates the size of data format that varies in accordance with the kind of drawing commands. The data proper to command is the data peculiar to each command. For instance, when BitBlt is received from OS 32 as a drawing command, command analysis routine 340 interprets the data shown in FIG. 8 as the data proper to the command as is. The data processed by scheduler 344 and communication controller 40 as described hereunder takes the same format as command analysis routine 340 as illustrated in FIG. 10.

Figure 11:
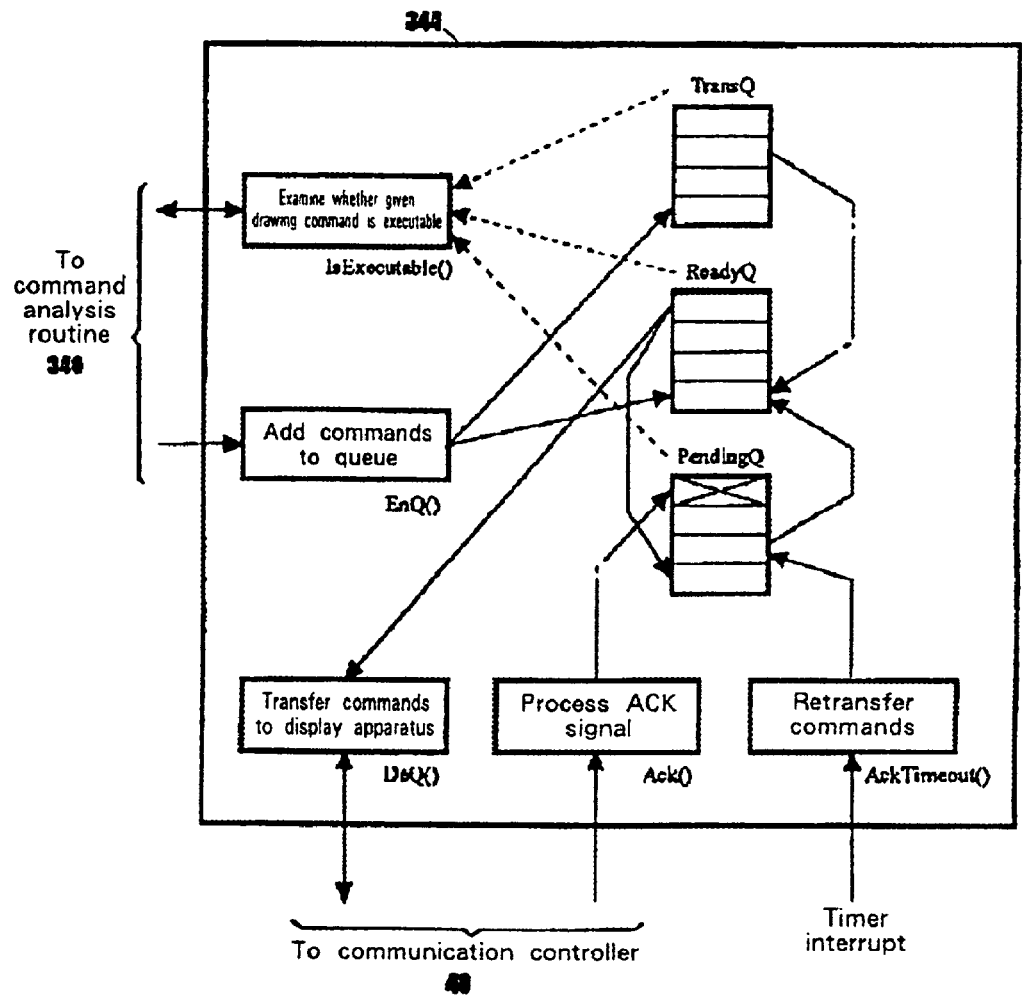
FIG. 11 is a diagram showing the status change of a scheduler (FIG. 6)

FIG. 11 shows the status change of scheduler 344 (FIG. 6). As shown in FIG. 11, scheduler 344 receives drawing commands from command analysis routine 340, and carries out processes such as changing their execution sequence or merging them adequately in accordance with the mutual dependency of the drawing commands among themselves, and issues to communication controller 40 the drawing commands obtained as the result of such processing. At scheduler 344, the status of drawing commands is deemed to be either one of the following three:

TABLE 1

Status of Drawing Commands at Scheduler 344

Status 1: Pending
A status where the relevant command has already been issued to display apparatus 16 (FIG. 1), however, corresponding ACK signal has not been returned from display apparatus 16.
Status 2: Ready
A status where the relevant command is not dependent on other drawing commands and is readily transferable to display apparatus 16 any time.
Status 3: Dependent TABLE 1-continued Status of Drawing Commands at Scheduler 344

A status where the relevant command is dependent on other drawing commands and is not ready to be transferred to display apparatus 16 immediately.

The status 3 (Dependent status) shown in Table 1 is defined as the status of drawing commands where either one of the following conditions (e.g., see Table 2 below) is established, and the drawing command in the Dependent Status is never transferred from scheduler 344 to display apparatus 16 (FIG. 1) until other drawing commands having dependent relations with said command have been completed.

TABLE 2

Definition of Dependent Status

Condition 1-1:
There are uncompleted drawing commands (Y←OP X) which take the drawing areas of the relevant drawing command (X←IMAGE, X←OP, X←OP Z) as its source operand.
Condition 1-2:
There are uncompleted drawing commands (X←IMAGE, X←OP, X←OP Z) which are going to draw in areas indicated by source operand X
of the relevant drawing command (Y←OP X).

Scheduler 344 changes the status of each drawing command as the occasion requires when there is a possibility that interdependent relations among the drawing commands changes due to merging of drawing commands or due to the returning of an ACK signal for a certain drawing command from display apparatus 16.

There are various methods available theoretically to control the status of drawing commands. However, one of them is to utilize the queue that corresponds to each of the above three statuses.

A status control method using such a queue will be explained hereunder. For instance, scheduler 344 provides command analysis routine 340 with the following two functions shown in Table 3:

TABLE 3

Function provided by Scheduler 344 for Command Analysis Routine 340

Function 1-1: IsExecutable
Examines whether or not the drawing command from operating system 32 is immediately executable.
Function 1-2: EnQ
Puts the drawing command from operating system 32 under the control of scheduler 344 to be in either Ready status or Dependent status.

In this status control method utilizing queues, scheduler 344 adds the drawing IsExecutable of scheduler 344 makes judgment as to whether or not the drawing command issued from OS 32 to command analysis routine 340 is executable and returns the result of judgment (TRUE/FALSE) to command analysis routine 340 (i.e. executability confirmation of command).

Function IsExecutable makes a judgment that the drawing command is not executable when both of the following conditions exist. The reason why the drawing command is judged not executable is because, for instance, if the drawing command from OS 32 (X←IMAGE etc.) is executed and image data is written into frame memory 114 (FIG. 1) under such conditions, the execution result of the drawing command X'←IMAGE is not reflected correctly to frame memory 162 of display apparatus 16, thus the end result of the execution of the drawing command Y←OP X" becomes incorrect.

However, in some cases the areas of X and X' are the same while in other cases they overlap partially each other. If X, and X' are partially overlapped, it is possible that the drawing command is divided into two commands, one drawing in intersection of X and X', and the other drawing in other area. And the drawing area of drawing command X'←IMAGE itself is overwritten by X←IAMGE later, therefore, it does not matter whether or not the above result is incorrect.

TABLE 4

Conditions when Drawing Commands are Judged Not Executable

Condition 2-1:
There is another uncompleted command in pixel transfer mode (X'←IMAGE, X and X' overlapping) which is going to draw in the same drawing area as the relevant drawing command (X←IMAGE, X←OP, X←OP Z).
Condition 2-2:
After the drawing command X'←IMAGE, there is another drawing command in Dependent status (Y←OP X", X' and X" overlapping) which has X' as its source operand.

However, even when the conditions shown in Table 4 exist, there are some cases that a not-executable command becomes executable on condition that scheduler 344 makes adequate conversion of a plurality of interdependent drawing commands. For instance, in the above case, if function IsExecutbale converts the drawing command in command transfer mode Y←OP X" to a drawing command in a pixel transfer mode Y←IAMGE, then the drawing command X←IAMGE becomes executable.

A judgment as to whether drawing commands should be converted or not, for instance, can be made based on such criteria that IsExecutable corrects/converts a drawing command containing an source operand within to drawing commands in pixel transfer mode only when the data transfer volume on channel 22 can be reduced, based on an assumption that the transfer capacity of channel 22 between computer 10 and display apparatus 16 is the bottleneck of image processing apparatus 1 (FIG. 1).

When a drawing command is executable, function IsExecutable judges whether the drawing command is either in Ready status or Dependent status. If it is judged to be in Dependent status, function IsExecutable then judges which drawing commands have interdependent relations with the drawing command and stores the judgment result in Dependency List. Function IsExecutable also cancels an old command and merges it with a new command when a drawing command is executable and there is another uncompleted drawing command in pixel transfer mode which is going to draw in the area overlapping with the area of the relevant drawing command.

Figure 12:
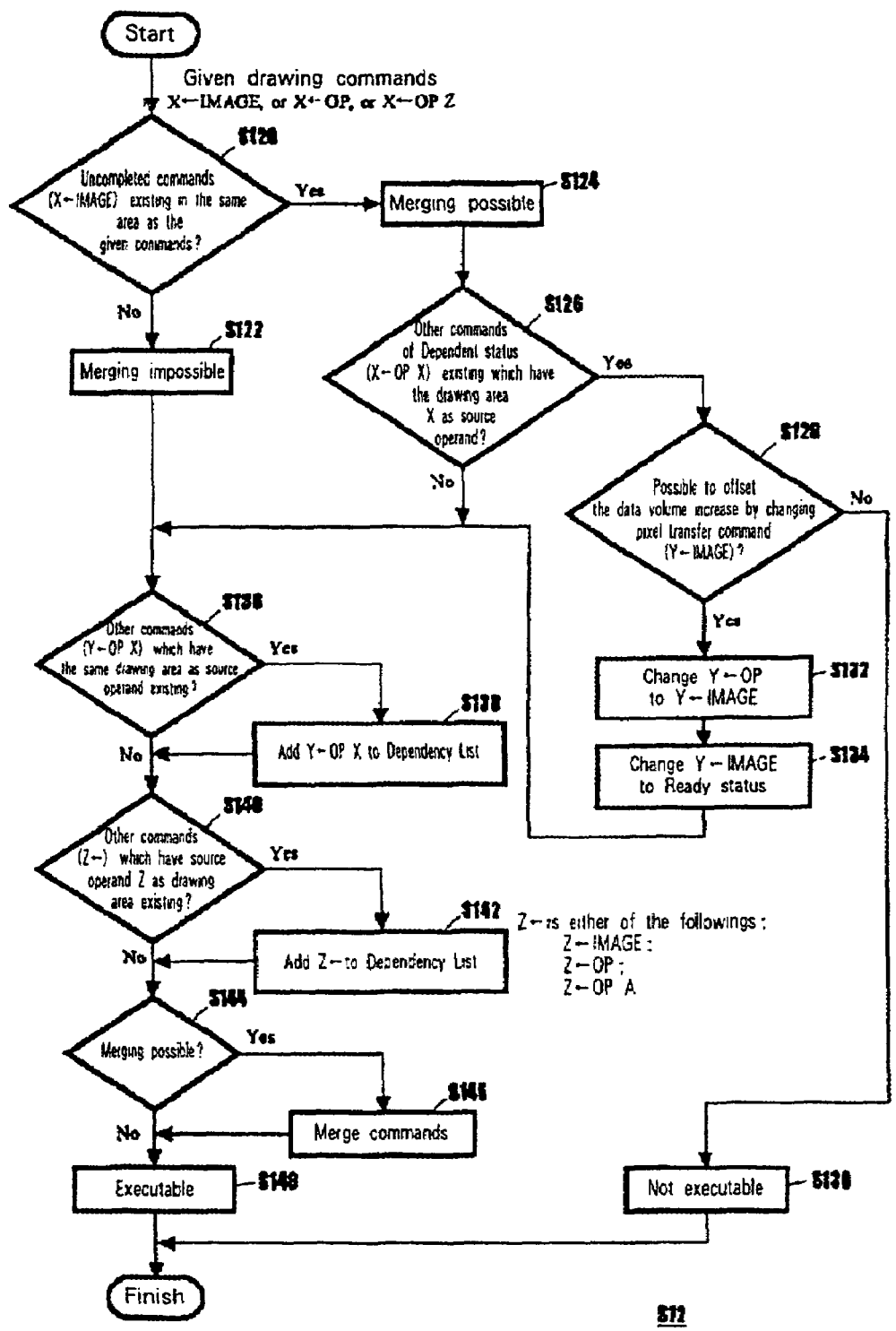
FIG. 12 is a flowchart that shows the processing of a function IsExecutable (S12) shown in Table 3.

FIG. 12 is a flowchart that illustrates the processing of IsExecutable (S12) shown in Table 3. In order to materialize the processing thus far explained, as shown in FIG. 12, at step 120 (S120) function IsExecutable judges whether or not there is any uncompleted drawing commands in pixel transfer mode (X←IMAGE) which are going to draw in the area same as the given drawing command, and if there is no such command it judges that merging is not feasible (S122) and proceeds to process S136, and in the other contrary case, it judges that merging is feasible (S124) and proceeds to process S126.

At step 126 (S126), function IsExecutable judges whether there are any other drawing commands of Dependent status having the drawing area X as their source operand (Y←OP X) after the command judged to be capable of merging at step 124, and if there are any, it proceeds to process S128, and in the other contrary case, it proceeds to process S136.

At step 128 (S128), function IsExecutable judges whether it is feasible by means of merging to offset the data volume increase on channel 22 (FIG. 1) that is caused by the change of drawing command in command transfer mode which is found at step 126 (S126) to drawing command in pixel transfer mode (Y←IMAGE). If it is feasible to offset, then it proceeds to process S132. Conversely, if it judges that it is not feasible (S130), the process is terminated.

At step 132 (S132), function IsExecutable converts the drawing command Y←OP X into the drawing command Y←IMAGE.

At step 134 (S134), function IsExecutable converts the status of drawing command Y←IMAGE that is obtained in process S132 into Ready status.

At step 136 (S136), function IsExecutable judges whether or not there are any other drawing commands having drawing area X as their source operand (Y←OP X). If there are any, then it adds the drawing command Y←OP X in the Dependency List (S138), and in the other, contrary case it proceeds to process S140.

At step 140 (S140), function IsExecutable judges whether or not there are any other drawing commands (Z←)which will draw to the same area as the source operand Z of relevant drawing command (X←OP Z). If there are any, it adds the drawing command Z← onto Dependency List (S142), and in the other contrary case, it proceeds to process S144.

At step 144 (S144), function IsExecutable judges whether or not there are any drawing commands which are judged to be capable of merging at step 124. If there are any, it merges them (S148), and in the other, contrary case it terminates the processing.

Function EnQ is explained further in detail hereunder. Function EnQ of scheduler 344 (FIG. 6) sets the drawing commands received from command analysis routine 340 in the Ready status or Dependent status, and adds them on to the end of either Ready Queue (FIG. 11) or Dependent Queue respectively.

Function EnQ is called by command analysis routine 340 when function IsExecutable returns TRUE to command analysis routine 340, i.e., a drawing command input from OS 32 is judged to be immediately executable.

Judgment of status (i.e., either Ready or Dependent) is made by function IsExecutable, based on which function EnQ changes the status of drawing commands accordingly. In other words, function EnQ interprets drawing commands to be in Dependent status when Dependency List is not vacant, and will not change the drawing command to Ready status until all the drawing commands that have interdependent relations with the relevant drawing command have been completed. On the other hand, when the Dependency List is vacant, function EnQ sets the drawing command in Ready status since it is feasible to transfer said drawing command to display apparatus 16 immediately. The drawing command set in Ready status is then transferred by function DeQ (to be explained later in reference to Table 5 etc.) to display apparatus 16.

For instance, in a data transfer from display apparatus 16 to computer 10 (Uplink) with high latency on communication channel 22, there is a possibility that data transfer becomes very inefficient a method is used to transfer ACK signals from display 16 to computer 10 upon completion of each drawing command. To cope with such cases, preferably a method is used to give a same group ID to a plurality of drawing commands so that one ACK signal is shared by a plurality of drawing commands contained in the group. Function EnQ carries out a role of such grouping of drawing commands and assigning of a group ID.

When the data transfer volume of a group exceeds a certain amount, a re-transfer cost inevitably increases when an error occurs on channel 22. Therefore, function EnQ sets EndOfGroup flag onto the last command to close the group when the data volume of a group has exceeded a predetermined threshold value, considers the drawing commands input from OS 32 thereafter to be in a new group, and then assigns them a new group ID.

Figure 13:
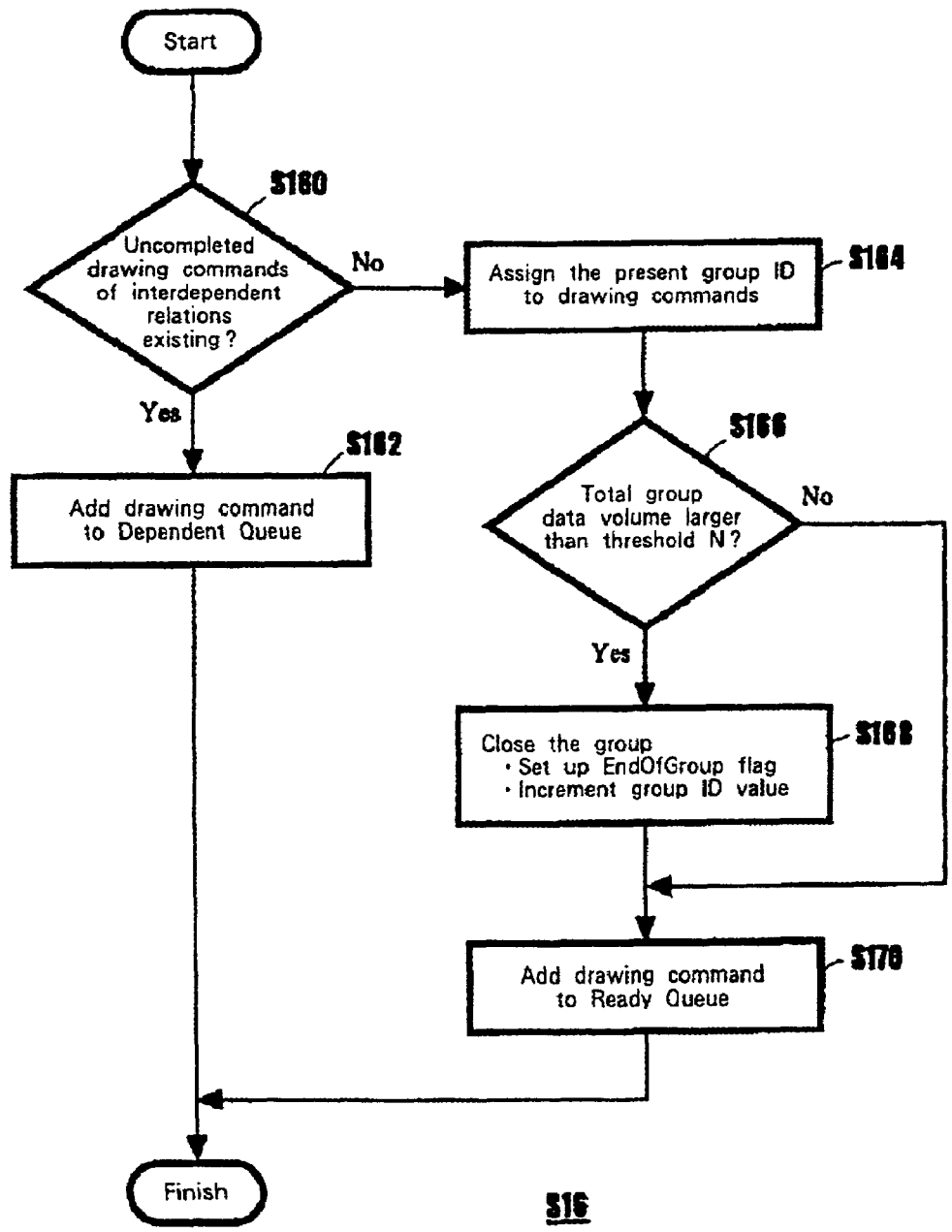
FIG. 13 is a flowchart showing the processing of a function EnQ (S16) shown in Table 3.

FIG. 13 is a flowchart that illustrates the processing of function EnQ (S16) shown in Table 3. As shown in FIG. 13, at step 160 (S160) function EnQ judges whether or not there are any uncompleted drawing commands which have interdependent relations with the relevant drawing command. If there are any, it proceeds to process S1162, and in the other, contrary case it proceeds to process S164.

At step 162 (S162), function EnQ adds the drawing command to Dependent Queue.

At step 164 (S164), function EnQ assigns the group ID then in use to the drawing command.

At step 166 (S166), function EnQ judges whether or not the total data volume is larger than threshold N. If it is larger, then it proceeds to process S168. Otherwise, it proceeds to process S170.

At step 168 (S168), function EnQ closes the group in order not to add a new drawing command to the group which is the objective of the processing at the time.

At step 170 (S1170), function EnQ adds the drawing command to Ready Queue (FIG. 11).

Scheduler 344 provides communication controller 40 with the following two functions shown below in Table 5.

TABLE 5

Functions provided by Scheduler 344 for Communication Controller 40

Function 2-1: DeQ
Pick up one drawing command of "Ready" status (Table 1) from the top of Ready Queue (FIG. 11) and pass it to communication controller 40. At the same time, change the status of the drawing command to "Pending" and move it to the end of Pending Queue.
Function 2-2: AcK When an ACK signal is returned from display apparatus 16, renew the interdependence relations between drawing commands within scheduler 344.

Function DeQ is further explained in detail hereunder. Function DeQ picks up the oldest drawing command of Ready status (i.e. from the top of Ready Queue), passes it to communication controller 40, and then change the status of the passed drawing command to "Pending" status.

When transferring drawing commands as a group to display, function DeQ closes the group at the time when all the drawing commands of "Ready" status have been processed and nothing more exists, sets EndOfGroup flag onto the last command in the same manner as function EnQ, and assigns a new group ID.

Figure 14:
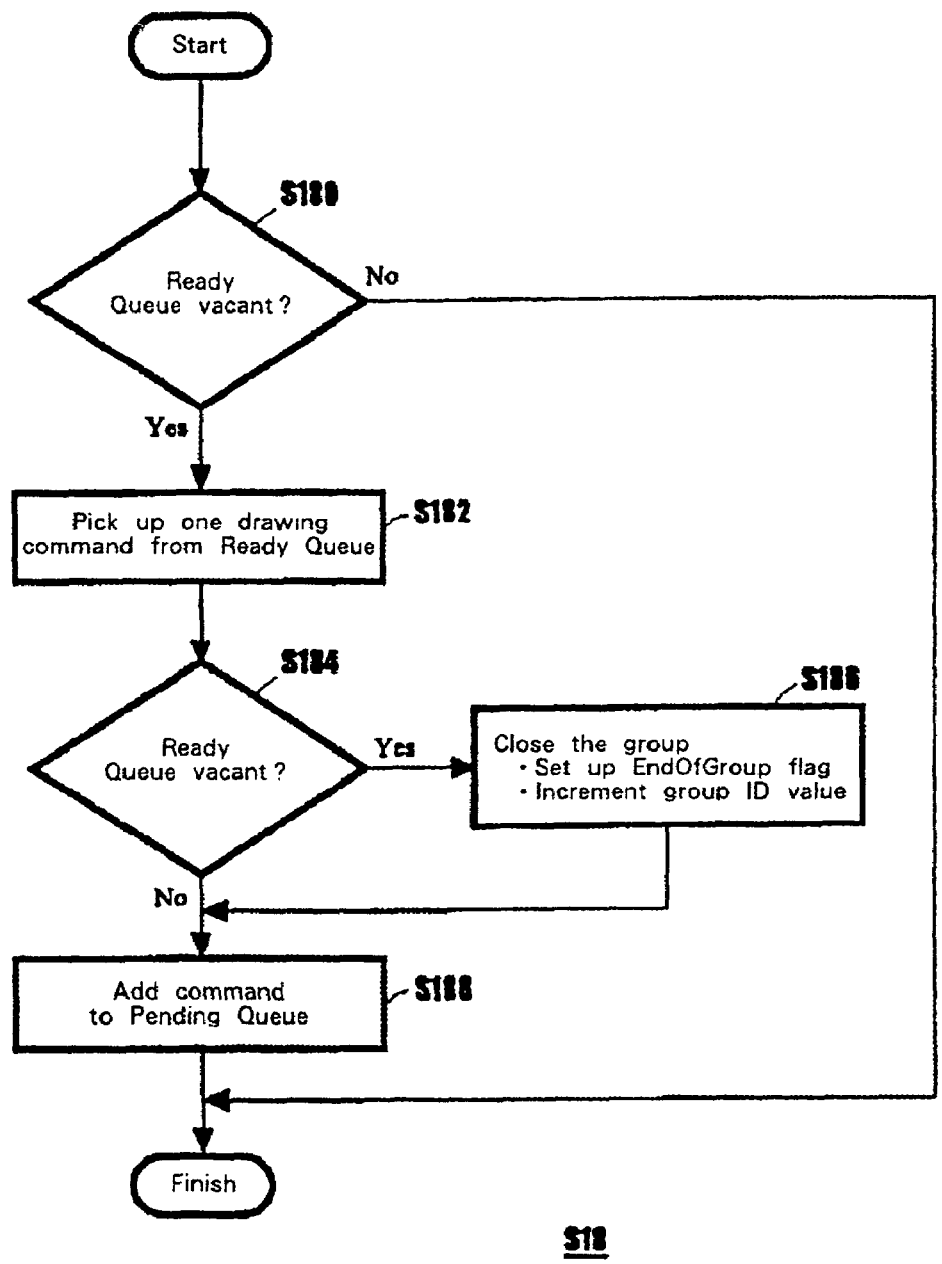
FIG. 14 is a flowchart showing the processing of a function DeQ (S18) shown in Table 4.

FIG. 14 is a flowchart that shows the processing of function DeQ (S18) shown in FIG. 11. As shown in FIG. 14, at step 180 (S180) function DeQ judges whether or not Ready Queue (FIG. 11) is vacant. If vacant, it terminates the processing, and in the other, contrary case it proceeds to process S182.

At step 182 (S182), function DeQ picks up one drawing command from the top of the Ready Queue.

At step 184 (S184), function DeQ judges whether or not Ready Queue is vacant. If vacant, it proceeds to process S186, and in the other, contrary case it proceeds to S188.

At step 186 (S186), function DeQ closes the group.

At step 188 (S188), function DeQ adds the drawing command to the end of Pending Queue.

Upon receipt of ACK signals from display 16, Function ACK suspends the timer processing corresponding to the group of ACK signal, if the timer processing is active. The timer processing is activated by communication controller 40 immediately after drawing commands have been transferred, to process errors in case ACK signals for respective group of drawing commands transferred to display apparatus 16 are not properly returned.

At this stage, if the timer processing corresponding to the received ACK signal was suspended, a timer event occurred and error processing has been under way. Therefore, function ACK simply terminates the process without doing anything. When the timer is suspended, function ACK deletes from scheduler 344 the drawing commands (of Pending status) which belong to the group the relevant ACK signal was returned to. In some cases interdependent relations among drawing commands may be canceled when drawing commands of Pending status are deleted. Function ACK looks for drawing commands which have interdependent relations with any drawing commands corresponding to the received ACK signals. Then if, among the drawing commands located, there are any drawing commands whose interdependent relations are canceled, it changes the status of such drawing commands to Ready.

Figure 15:
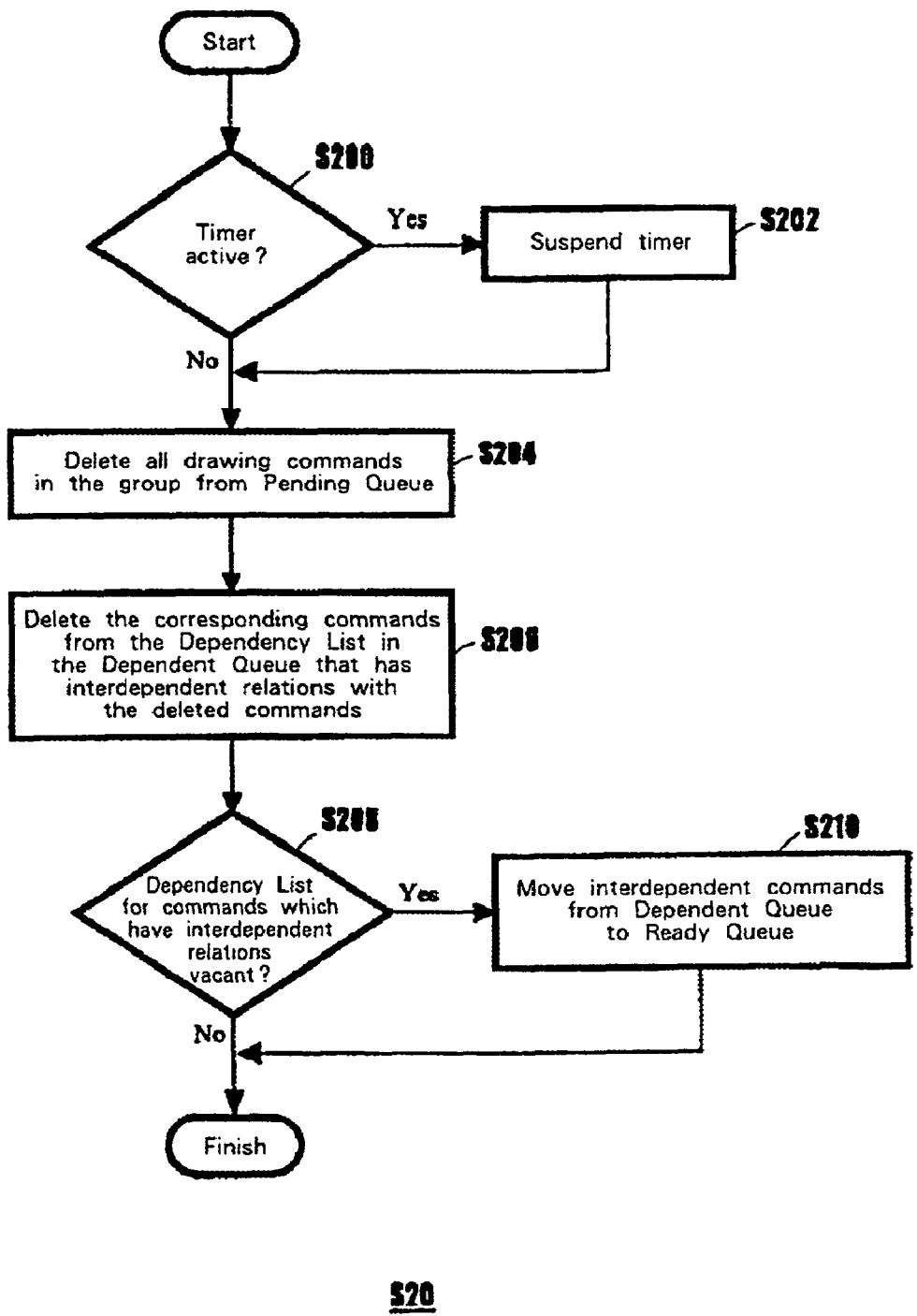
FIG. 15 is a flowchart showing the processing of a function ACK (S20) shown in FIG. 11.

Function ACK is further explained in detail hereunder. FIG. 15 is a flowchart that shows the processing of function ACK (S20) shown in FIG. 11. As shown in FIG. 15 at step 200 (S200), upon receipt of ACK signals from display 16, function ACK judges whether or not the processing of timer 36 (FIG. 6) corresponding to the relevant ACK signal is active. If active, it proceeds to the processing of S202, and in the other, contrary case, it proceeds to process S204.

At step 202 (S202), function ACK suspends the processing of timer 36 that corresponds to the ACK signal received in the process of S200.

At step 204 (S204), function ACK deletes from Pending Queue all the drawing commands which belong to the group that corresponds to the ACK signal received in the process of S200.

At step 206 (S206), function ACK deletes the drawing commands which were deleted in the process of S204 from the Dependency List of drawing commands which have interdependent relations with those deleted in the process of S204.

At step 208 (S208), function ACK judges whether or not Dependency List becomes vacant after the drawing commands were deleted in the process of S206. If vacant, then it proceeds to the process of S210, and in the other, contrary case it terminates the processing.

At step 210 (S210), function ACK moves the drawing commands from Dependent Queue to Ready Queue when it is judged that the items corresponding thereto have been vacated from Dependency List in the process of S208.

Furthermore, in the event that ACK signals are not returned from display apparatus 16 and errors occur, scheduler 344 provides timer event handler, i.e., function AckTimeout, which picks up drawing commands which caused errors from Pending Queue (FIG. 11), changes them from "Pending" status to "Ready" status, and then moves the commands to the end of Ready Queue in order to process errors.

Function AckTimeout is called up by the occurrence of a timer event that is activated by timer 36 when drawing commands transferred from computer 10 to display apparatus 16 is not completed normally, and an ACK signal is not returned to computer even after a lapse of certain time.

Function AckTimeout sets EndOfGroup flag onto the last one of the drawing commands of Ready status left in scheduler 344, and increments the value of group ID. After this processing, scheduler 344 re-registers the drawing commands in the group which caused errors as the ones in a new group, and furthermore changes the status of the drawing commands which belong to the error group from "Pending" to "Ready" status. The drawing commands re-registered in this manner are re-transferred to display apparatus 16 by communication controller 40.

Figure 16:
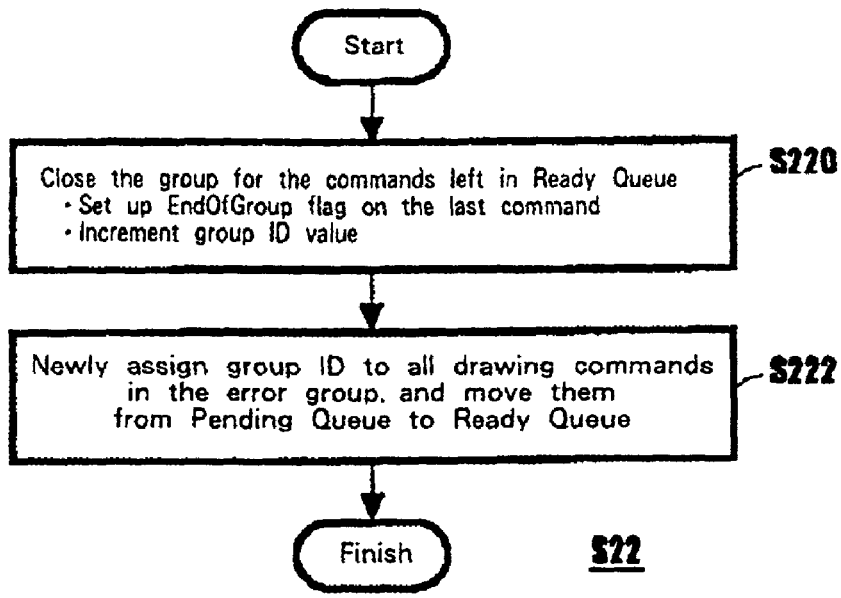
FIG. 16 is a flowchart that shows the processing of a timer event handler AckTimeout shown in FIG. 11.

FIG. 16 is a flowchart that shows the processing of timer event handler AckTimeout (S22) shown in FIG. 11. As shown in FIG. 16, at step 220 (S220) function AckTimeout closes the group of drawing commands which are left in Ready Queue. In other words, the function AckTimeout sets up EndOfGroup flag onto the last drawing command left in Ready Queue, and increments the value of the group ID.

At step 222 (S222), function AckTimeout assigns a new group ID to all the drawing commands that belong to the group which had errors, and moves them from the Pending Queue to the Ready Queue.

Drawing routine 342 (FIG. 6), for instance, utilizes drawing engine 122 (FIG. 2) to perform graphics arithmetic that is necessary for the execution of drawing commands input from command analysis routine 340, generates image data, and stores them in frame memory 114.

Communication controller 40 (FIG. 6) picks up the drawing commands of "Ready" status from scheduler 340. Communication controller 40 also reads out pixel data from frame memory 114 if necessary, generates packets that contain drawing commands as well as relevant pixel data, and transfers the generated packets to display apparatus 16 utilizing communication control apparatus 126 (FIG. 2). When the system is set such that an ACK signal is received corresponding to each drawing command, communication controller 40 activates timer 36 to monitor a timeout each time it transfers a packet. In order to set up the system so as to receive ACK signals for each group which includes a plurality of drawing commands respectively, communication controller 40 checks the EndOfGorup flags contained in the drawing commands during the process of packet generation, and operates timer 36 after transferring the packet that corresponds to the last drawing command in the said group.

Figure 17:
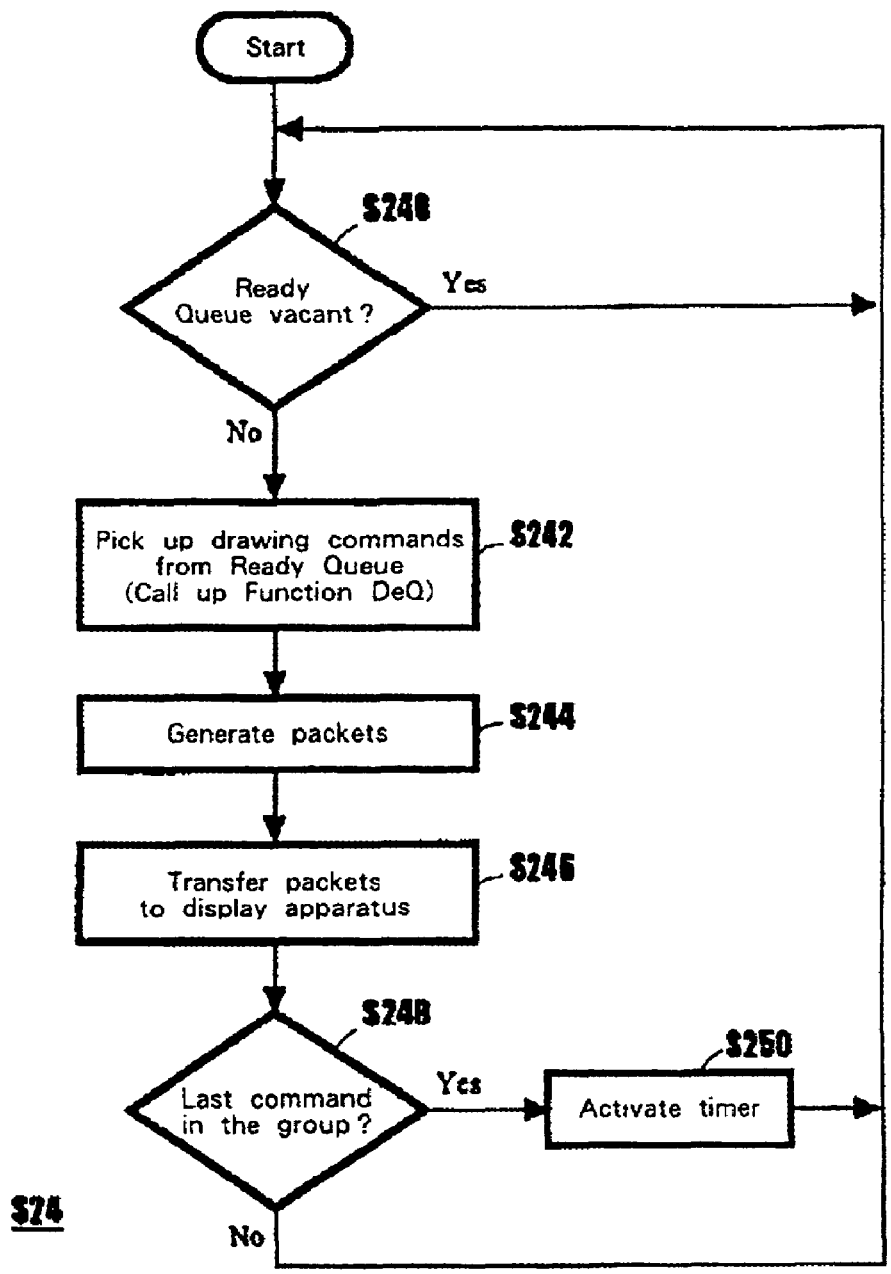
FIG. 17 is a flowchart showing the processing of a communication controller (S24) shown in FIG. 6.

FIG. 17 is a flowchart that shows the processing of communication controller 40 (S24) shown in FIG. 6.

As shown in FIG. 17, at step 240 (S240) communication controller 40 makes judgment whether or not Ready Queue of scheduler 344 (FIG. 11) is vacant. If vacant, then it stays in the process of S240, and in the other, contrary case it proceeds to the process of S242.

At step 242 (S242), communication controller 40 picks up a drawing command from the top of Ready Queue in scheduler 344.

At step 244 (S244), communication controller 40 reads out pixel data from frame memory 114 as the need arises, and generates packets which contain drawing commands etc.

At step 246 (S246), communication controller 40 controls the communication control apparatus 126 in order to have it transfer the packets generated in the process of S244 to display apparatus 16 via communication channel 22 (FIG. 1).

At step 248 (S248), communication controller 40 judges whether or not the drawing command contained in the packet that was transferred to display apparatus 16 in the process of S246 is the last command in the relevant group. If it is the last drawing command in the group, then it proceeds to the process of S250. However, in the other case it returns to the process of S240.

At step 250 (S250), communication controller 40 operates timer 36 to activate the timer processing function that monitors timeout for wait for ACK signal corresponding to the group transferred in the process of S246.

Figure 18:
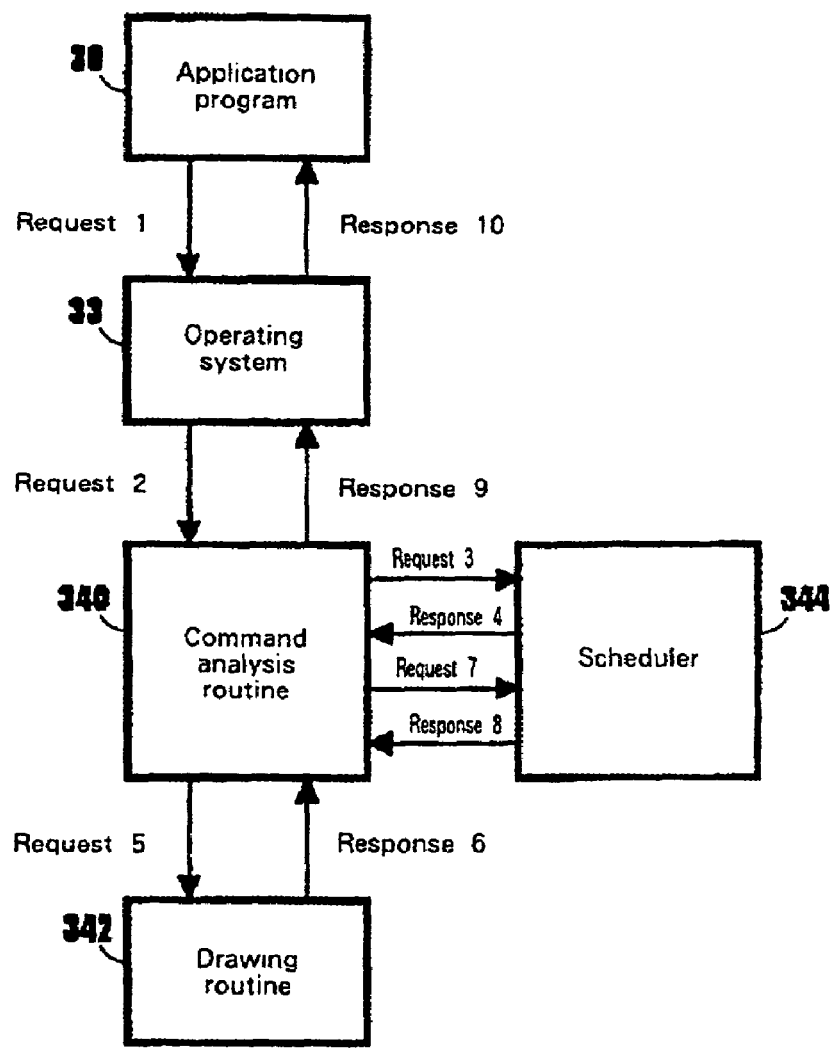
FIG. 18 is a sequence chart of items selected from the entire operations of the image processing apparatus (FIG. 1) to show specifically the process from the stage where drawing commands are issued from the application program (FIG. 5) to the stage when they enter the queue of the scheduler via the OS and others.
Figure 19:
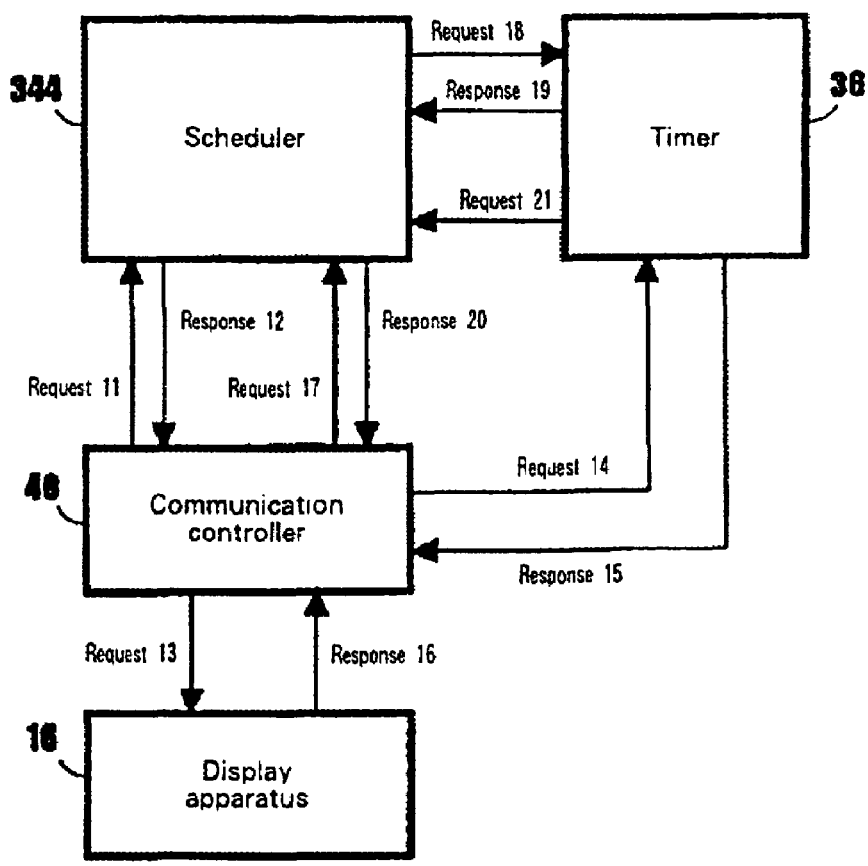
FIG. 19 is a sequence chart showing the process where the communication controller (FIG. 6) picks up drawing commands from the queue of the scheduler and transfers them to the display apparatus.

In reference to FIG. 18 and FIG. 19, operation of image processing apparatus 1 is further explained hereunder. FIG. 18 is a sequence chart that illustrates the process from the stage when drawing commands are issued from application program 30 (FIG. 5) through when they enter the queue of scheduler 344 via OS 32.

FIG. 19 is a sequence chart that shows the process where communication controller 40 (FIG. 6) picks up the drawing commands from the queue of scheduler 344 and transfers them to display apparatus 16.

As shown in FIG. 18, application program 30 calls graphics API to issue drawing request for operating system 32 (Request 1). Upon receipt of the above request, OS 32 calls designated function which is exported to OS 32 by graphics driver 34, and issues a drawing command to command analysis routine 340 in graphics driver 34 (Request 2).

Upon receipt of the above request 2, command analysis routine 340 inquires scheduler 344 whether or not the drawing command is immediately executable (Request 3). Upon receipt of the above request 3, scheduler 344 examines whether or not the drawing command is immediately executable and responds to command analysis routine 340 (Response 4).

In the above process of response 4, if scheduler 344 makes judgment that the drawing command is immediately executable and responds to that effect, command analysis routine 340 issues a drawing command to drawing routine 342 (Request 5). Drawing routine 342 carries out the drawing process in accordance with the drawing command received in the process of request 5, and stores the generated image data in frame memory 114. Upon completion of the drawing process, drawing routine 342 notifies command analysis routine 340 of the normal completion of drawing process (Response 6).

Upon receipt of the notice of normal completion of drawing process in the process of Response 6, command analysis routine 340 adds the drawing command to the queue of scheduler 344 (Request 7).

Scheduler 344 replies to command analysis routine that the drawing command has duly been added to the queue (Response 8). Command analysis routine 340 notifies operating system 32 of the completion of drawing process (Response 9). Operating system 32 notifies application program 30 of the completion of drawing process (Response 10).

Furthermore, as shown in FIG. 19, communication controller 40 picks up drawing commands from the queue of scheduler 344 and transfers them to display apparatus 16. In other words, communication controller 40 requests scheduler 344 to pick up a drawing command in Ready status from the queue (Request 11). In response to the above Request 11, scheduler 344 passes communication controller 40 one of the drawing commands in Ready status (Response 12).

Communication controller 40 generates a packet and transfers it to display apparatus 16 (Request 13). In this case "drawing" only means that relevant processing is conducted by computer 10 toward frame memory 114, and does not mean that the image is actually displayed on display 114.

Communication controller 40 requests the activation of timer designating the timeout value which indicates a lapse of time between the transfer of drawing commands and the returning of ACK signal (Request 14). Timer 36 notifies communication controller 40 of normal activation of timer (Response 15).

Display apparatus 16 notifies communication controller 40 of the normal completion of drawing process (Response 16). Upon receipt of the above Response 16, communication controller 40 requests scheduler 344 the change of interdependent relations among the drawing commands (Request 17).

Scheduler 344 renews the interdependent relations among the drawing commands and suspends the timer processing of timer 36 (Request 18). Timer 36 notifies scheduler 344 of the normal suspension of timer processing (Response 19).

Scheduler 344 notifies communication controller 40 of the normal completion of the processing in connection with the above Request 17 (Response 20). In the event that Response 16 is not returned even after a lapse of certain time (i.e. designated timeout value) since timer activation at above Request 14, timer requests scheduler to retransfer the drawing commands (Request 21).

As described above, a data transferring apparatus and method according to the present invention enable the efficient transfer of image data in such a case, for instance, as to connect a high resolution display apparatus to computer.

While the invention has been described in terms of several preferred embodiments, those skilled in the art will recognize that the invention can be practiced with modification within the spirit and scope of the appended claims.

The invention claimed is:

1. A data transferring apparatus for transferring transfer packets each including one or more transfer data as objectives of transfer from a first apparatus to a second apparatus, said each transfer data including commands indicating processes against a preliminarily assigned area, said first apparatus including:
 a scheduler for merging a plurality of drawing commands meeting a certain requirement and for translating said merged drawing commands into a single drawing command, thereby reducing a volume of said transfer data; and
 a communication controller for generating transfer packets each including at least one of said plurality of drawing commands whose amount is within a certain predetermined range and one or more said merged drawing commands,
 said communication controller transferring said generated transfer packets to said second apparatus.

2. A data transferring apparatus for transferring transfer packets each including one or more transfer data as objectives of transfer from a first apparatus to a second apparatus, said each transfer data including commands indicating processes against a preliminarily assigned area, said first apparatus including:
 means for merging a plurality of drawing commands meeting a certain requirement and for translating said merged drawing commands into a single drawing command, thereby reducing a volume of said transfer data;
 means for generating transfer packets each including at least one of one or more said plurality of drawing commands whose amount is within a certain predetermined range and one or more said merged drawing commands; and
 means for transferring said generated transfer packets to said second apparatus.

3. The apparatus of claim 2, wherein said means for merging comprises a scheduler for judging whether an offset can be performed by merging an increment of data volume caused by a change of drawing commands.

4. The apparatus of claim 3, wherein if said scheduler judges that said offset is possible, then said scheduler changes the drawing commands.

5. The apparatus of claim 3, wherein said means for generating comprises a communication controller which generates said transfer packets which contain merged drawing commands which are more than a predetermined data volume in quantity.

6. The apparatus of claim 2, wherein said first apparatus comprises a computer and said second apparatus comprises a display apparatus.

7. A data transferring method for transferring transfer packets each including one or more transfer data as objectives of transfer from a first apparatus to a second apparatus, said each transfer data including commands indicating processes against a preliminarily assigned area, and said first apparatus being capable of:
 merging a plurality of drawing commands meeting a certain requirement and translating said merged drawing commands into a single drawing command, thereby reducing a volume of said transfer data;
 generating transfer packets each including at least one of said plurality of drawing commands whose amount is within a certain predetermined range and one or more said merged drawing commands; and
 transferring said generated transfer packets to said second apparatus.

8. The method of claim 7, wherein said merging comprises judging whether an offset can be performed by merging an increment of data volume caused by a change of drawing commands.

9. The method of claim 8, wherein if said judging judges that said offset is possible, then the drawing commands are changed.

10. The method of claim 7, wherein said first apparatus comprises a computer and said second apparatus comprises a display apparatus.

11. A medium for mediating a program for transferring transfer packets each including one or more transfer data as objectives of transfer from a first apparatus to a second apparatus, said each transfer data including commands indicating processes against a preliminarily assigned area, and said first apparatus being capable of making a computer execute:
 merging a plurality of drawing commands meeting a certain requirement and translating said merged drawing commands into a single drawing command, thereby reducing a volume of said transfer data;

generating transfer packets each including at least one of said plurality of drawing commands whose amount is within a certain predetermined range and one or more said merged drawing commands; and transferring said generated transfer packets to said second apparatus.

12. The medium of claim 11, wherein said merging comprises judging whether an offset can be performed by merging an increment of data volume caused by a change of drawing commands.

13. The medium of claim 12, wherein if said judging judges that said offset is possible, then the drawing commands are changed.

14. The medium of claim 12, wherein said first apparatus comprises a computer and said second apparatus comprises a display apparatus.

15. The apparatus of claim 1, wherein said scheduler generates said drawing commands to be transferred from said first apparatus to said second apparatus by combining an effect of said plurality of drawing commands which affect a same area in a predetermined short period of time on a frame buffer.

16. The apparatus of claim 2, wherein said means for merging generates said drawing commands to be transferred from said first apparatus to said second apparatus by combining an effect of said plurality of drawing commands which affect a same area in a predetermined short period of time on a frame buffer.

17. The method of claim 7, wherein said merging further comprises generating a plurality of drawing instructions to be transferred from said first apparatus to said second apparatus by combining an effect of a plurality of drawing instructions which affect a same area in a predetermined short period of time on a frame buffer.

18. The apparatus of claim 1, wherein said communication controller transfers only updated areas on a frame memory by analyzing graphics commands in a form of drawing commands to said second apparatus.

19. The apparatus of claim 2, wherein said means for transferring transfers only updated areas on a frame memory by analyzing graphics commands in a form of drawing commands to said second apparatus.

20. The method of claim 7, wherein said transferring comprises transferring only updated areas on a frame memory by analyzing graphics commands in a form of drawing commands to said second apparatus.

21. The apparatus of claim 2, wherein said first apparatus includes a first drawing engine and said second apparatus includes a second drawing engine.

22. The apparatus of claim 2, wherein said first apparatus and said second apparatus include redundant drawing engines.

23. The apparatus of claim 2, wherein said first apparatus comprises a computer including a first drawing engine, and wherein said second apparatus comprises a display apparatus including a second drawing engine.

24. The apparatus of claim 21, wherein said first drawing engine and said second drawing engine each include a dedicated frame memory unit.

25. The apparatus of claim 21, wherein said first drawing engine and said second drawing engine generate identical images including a different timing due to at least one communication error from said first apparatus to said second apparatus.

* * * * *